United States Patent
Du et al.

(10) Patent No.: US 9,676,629 B2
(45) Date of Patent: Jun. 13, 2017

(54) HELIUM ENHANCED HEAT TRANSFER IN ADSORPTIVE LIQUID OR GAS PHASE ARGON PURIFICATION PROCESSES

(71) Applicants: Hai Du, East Amherst, NY (US); Scot E. Jaynes, Lockport, NY (US); Steven R. Falta, Honeoye Falls, NY (US); Neil A. Stephenson, East Amherst, NY (US)

(72) Inventors: Hai Du, East Amherst, NY (US); Scot E. Jaynes, Lockport, NY (US); Steven R. Falta, Honeoye Falls, NY (US); Neil A. Stephenson, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/734,522

(22) Filed: Jun. 9, 2015

(65) Prior Publication Data

US 2016/0362298 A1    Dec. 15, 2016

(51) Int. Cl.
*B01D 53/04*       (2006.01)
*C01B 23/00*       (2006.01)
(Continued)

(52) U.S. Cl.
CPC ...... *C01B 23/0078* (2013.01); *B01D 53/0438* (2013.01); *B01D 53/0462* (2013.01); *F25J 3/04775* (2013.01); *F25J 3/08* (2013.01); *B01D 2256/18* (2013.01); *B01D 2257/102* (2013.01); *B01D 2257/104* (2013.01);
(Continued)

(58) Field of Classification Search
CPC ........ C01B 23/0078; C01B 2210/0034; B01D 53/0462; F25J 3/04775; F25J 3/08; F25J 2205/64

USPC ......... 95/114, 115, 130, 138, 148; 210/660, 210/670
See application file for complete search history.

(56) References Cited

U.S. PATENT DOCUMENTS 2,810,454 A * 10/1957 Jones ..................... C01B 23/00
                                                          95/138
3,854,913 A * 12/1974 Leyarovski .......... F25J 3/04642
                                                          62/648
(Continued)

FOREIGN PATENT DOCUMENTS

CA        2243389         1/1999
EP    0 514 163 A2       11/1992
(Continued)

OTHER PUBLICATIONS

Federov, A.N., "Investigation and Improvement of Cryogenic Adsorption Purification of Argon from Oxygen", Gas Separation & Purification, vol. 9, No. 2, pp. 137-145, XP055121716, ISSN: 0950-4214, DOI: 10.1016/0950-4214(95)93951-F, (1995).

*Primary Examiner* — Frank Lawrence
(74) *Attorney, Agent, or Firm* — Ralph J. Mancini

(57) ABSTRACT

The present invention generally relates to a method to enhance heat transfer in the temperature swing adsorption process (TSA) and to an intensified TSA process for gas/liquid purification or bulk separation. Helium is designed as the heat carrier media to directly bring heat/cool to the adsorbent bed during the TSA cycling process. With helium's superior heat conductivity, the time consuming regeneration steps (warming, regeneration and precooling) of TSA process can be significantly reduced and allowing for the TSA process to be intensified.

38 Claims, 8 Drawing Sheets

(51) Int. Cl.
*F25J 3/04* (2006.01)
*F25J 3/08* (2006.01)

(52) U.S. Cl.
CPC *B01D 2259/402* (2013.01); *C01B 2210/0034* (2013.01); *C01B 2210/0045* (2013.01); *F25J 2205/64* (2013.01)

(56) References Cited

U.S. PATENT DOCUMENTS

| | | |
|---|---|---|
| 3,996,028 A | 12/1976 | Golovko et al. |
| 4,045,191 A * | 8/1977 | Martin .................. B01D 53/047 62/620 |
| 4,477,265 A | 10/1984 | Kumar et al. |
| 4,717,406 A | 1/1988 | Giacobbe |
| 5,114,445 A | 5/1992 | Burton et al. |
| 5,159,816 A | 11/1992 | Kovak et al. |
| 5,174,979 A | 12/1992 | Chao et al. |
| 5,601,634 A | 2/1997 | Jain et al. |
| 5,685,172 A | 11/1997 | Darredeau et al. |
| 5,730,003 A | 3/1998 | Nguyen et al. |
| 5,783,162 A * | 7/1998 | Tomita ................ C01B 23/0094 423/219 |
| 5,784,898 A | 7/1998 | Gary |
| 6,023,945 A | 2/2000 | Wong et al. |
| 6,083,301 A | 7/2000 | Gary et al. |
| 6,240,744 B1 | 6/2001 | Agrawal et al. |
| 6,250,106 B1 | 6/2001 | Agrawal |
| 6,491,884 B1 * | 12/2002 | Faller .................... B01D 53/02 423/210 |
| 6,572,838 B1 | 6/2003 | Sebastian et al. |
| 7,234,691 B2 | 6/2007 | Kovak |
| 7,294,172 B2 | 11/2007 | Baksh et al. |
| 7,452,407 B2 | 11/2008 | Golden et al. |
| 7,501,009 B2 | 3/2009 | Graham et al. |
| 8,480,860 B2 | 7/2013 | Kovak |
| 2012/0141868 A1 | 6/2012 | Hirano |
| 2014/0245781 A1 | 9/2014 | Kechagia et al. |
| 2014/0245782 A1 | 9/2014 | Barrett et al. |
| 2014/0249023 A1 | 9/2014 | Barrett et al. |

FOREIGN PATENT DOCUMENTS

| | | |
|---|---|---|
| EP | 0 893 156 A2 | 1/1999 |
| EP | 1 291 067 A2 | 3/2003 |
| WO | WO 03/011434 A1 | 2/2003 |
| WO | WO 2011/024687 A1 | 3/2011 |

* cited by examiner

HELIUM ENHANCED HEAT TRANSFER IN ADSORPTIVE LIQUID OR GAS PHASE ARGON PURIFICATION PROCESSES

FIELD OF THE INVENTION

The present invention relates to a method to enhance heat transfer in a temperature swing adsorption process (TSA) and to an intensified TSA process for gas/liquid purification or bulk separation.

DESCRIPTION OF RELATED ART

Temperature swing adsorption ("TSA") processes are based on the periodic variation of the temperature of an adsorbent bed and are widely used in gas/liquid purification or bulk separation. The adsorption occurs at a lower temperature and the bed is regenerated at a higher temperature. TSA processes are commonly used for trace impurity removal from air in pre-purification systems as well as abatement of volatile organic compounds from process gas streams.

The adsorption of gases onto an adsorbent is an exothermic process, i.e., the temperature of an adsorbent will rise during the course of an adsorption process because of the heat given off during the adsorption. The quantity of heat given off is directly proportional to the amount adsorbed, and depends on several factors including concentration in the gas mixture of the component that is being adsorbed: the more impurity adsorbed from a gas/liquid stream the greater the amount of heat given off during the adsorption step and the greater the temperature rise.

In most gas/liquid adsorption processes the adsorption efficiency is inversely proportional to the temperature at which the adsorption is conducted. The ability of an adsorbent to adsorb a given impurity generally diminishes as the temperature of the adsorption bed increases. Because of this it is usually desirable to conduct the adsorption at a low temperature, and to minimize any increase in bed temperature as the adsorption proceeds.

The problem of temperature rise can be particularly acute when, for the purpose of maintaining product purity specifications it is necessary to conduct an adsorption process at just above the dew point of the gas mixture, and even a small increase in bed temperature will cause the product to fail to meet purity requirements. In such cases it is often necessary to reduce the concentration of the impurity to be adsorbed as much as possible by other techniques prior to the adsorption procedure and to apply cooling to the bed to maintain it at constant temperature during adsorption.

The key steps in a TSA cycle process are adsorption (purification) to make product, warming (purge) the adsorbent bed to regenerate the adsorbent, and pre-cooling the adsorbent bed for next cycle. TSA cycle times are usually quite long due in part to the poor heat conductivity of most adsorbents, leading to high energy consumption and large amounts of adsorbent needed. As a result, there is considerable interest in the field focused on intensifying the TSA process to overcome the above mentioned disadvantages. Most of the studies are focusing on the adsorbent vessel design to increase heat conduction between the adsorbent and the heat transfer media. For example, shell and tube heat exchanger type adsorbent vessel is proposed in EP1291067 aiming to intensify the TSA process. Others' proposed different vessel configurations to enhance the heat conduction during TSA process. Those designs are complex and significantly increase the TSA process capital costs.

In the cryogenic liquid purification area, purification is conducted under cryogenic temperatures, and the adsorbent is regenerated at higher temperatures. After regeneration the adsorbent bed is pre-cooled down to cryogenic temperatures for the next purification cycle. Typically in the current art, the adsorbent in the vessel is directly cooled by either a cold product stream or cold crude (impurity containing) feed stream. However, since the adsorption capacity of the adsorbent is high at cryogenic temperatures, precooling with a direct flow stream, i.e., direct cooling, is normally avoided due to the parasitic loading of the coolant on the adsorbent, which diminishes the adsorbent's capacity to remove the impurities from the feed stream being purified. In order to compensate for the capacity loss during cooling many systems are overdesigned, leading to increased capital expenditures. With indirect cooling, the vessel is typically designed with a jacket around the adsorbent bed and uses cooling media in the jacket to indirectly cool down the adsorbent in the inner vessel. Direct contact between the cooling media and the adsorbent is therefore avoided. However, during the indirect cooling step, any gas residue molecules left from previous purge step are adsorbed onto the adsorbent, which can create a vacuum environment inside the inner adsorbent vessel. This vacuum requires the appropriate vessel design to ensure structural integrity, and all valves and connections represent potential leak points. The vacuum created in the inner adsorbent vessel during the indirect cooling also reduces the heat transfer to a large extent. Therefore, from vessel design standpoint, a heat exchange type vessel with small adsorbent vessel diameter is required and significant time is needed to indirectly cool down the adsorbent in the inner vessel. These drawbacks place limits on vessel design for intermediate and large plants, affect the overall capacity of the TSA purifier, and add significant costs to design and operating reliability.

U.S. patent application 2014/0245781, which is incorporated herein in its entirety by reference, discloses an adsorptive liquid argon (LAR) purification process using a temperature swing adsorption (TSA) cycling from 90K to ambient temperature that removes 10-10,000 ppm $O_2$ from a liquid argon stream. The bed after regeneration is subjected to an indirect cooling step to a specified temperature, at least 150K, prior to bringing the cryogenic liquid in direct contact with the adsorbent, which is important to control the micro structure of the adsorbent and ensure that the capacity of the bed to remove $O_2$ is maximized. The indirect cooling step is, however, a time limiting step due to the poor heat conductivity of adsorbent bed, which constrains process cycle time and restricts process intensification. The indirect cooling time increases with increasing adsorbent vessel diameter and becomes an important consideration to ensure cooling of the inner of adsorbent bed by heat transfer to the jacket. Also, during the indirect cooling step, a vacuum is formed inside the vessel as the gas molecules left in adsorbent vessel from prior purging steps are adsorbed onto the adsorbent.

The present invention seeks to alleviate the aforementioned deficiencies by providing a method to enhance heat transfer in the temperature swing adsorption process (TSA) and an intensified TSA process for gas/liquid purification or bulk separation. Other objects and aspects of the present disclosure will become apparent to one of ordinary skill in the art upon review of the specification, drawings, and claims appended hereto.

SUMMARY OF THE INVENTION

The present invention generally relates to a method to enhance heat transfer in the temperature swing adsorption process (TSA) and to an intensified TSA process for gas/liquid purification or bulk separation. Helium is designed as the heat carrier media/transfer gas to directly bring heat/cool to the adsorbent bed during the TSA cycling process. With helium's superior heat conductivity, the time consuming regeneration steps (warming, regeneration and precooling) of TSA process can be significantly reduced and allowing for the TSA process to be intensified.

BRIEF DESCRIPTION OF THE FIGURES

The objectives and advantages of the invention will be better understood from the following detailed description of the preferred embodiments thereof in connection with the accompanying figure wherein like numbers denote the same features throughout.

DETAILED DESCRIPTION OF THE INVENTION

Figure 1:
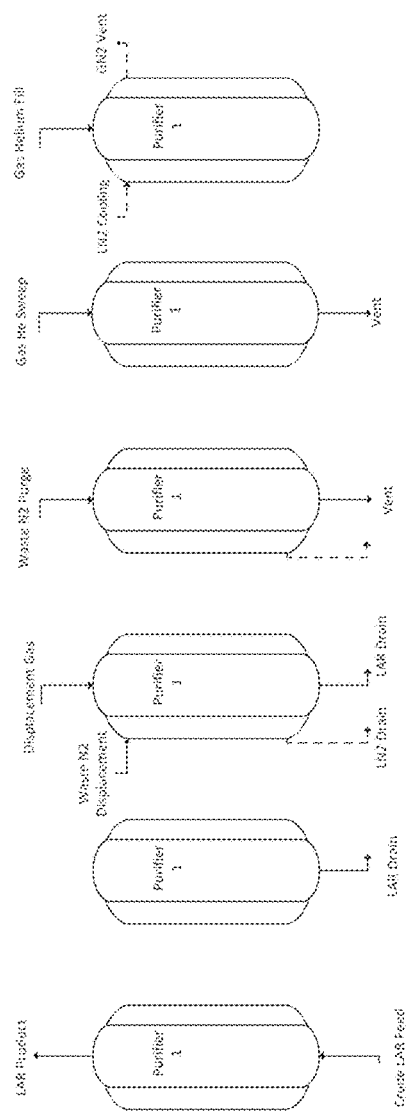
FIG. 1 illustrates an adsorptive LAR purification process with indirect cooling.

The invention relates to a method for enhancing heat transfer in a TSA process and to an intensified TSA process for gas/liquid purification or bulk separation. The intensified TSA process of the invention can be used to purify any gas which can be liquefied at the temperature at which it is desired to conduct the adsorption process and is applicable to methods and systems that heat and/or cool directly and/or indirectly.

In one embodiment the process of the invention is advantageously utilized to purify a permanent gas, i.e., a gas that cannot be condensed by pressure alone, by removing one or more permanent gas impurities therefrom. Included among the permanent gases are oxygen, nitrogen, carbon monoxide, methane, and the noble gases, for example, argon, helium, neon, krypton, xenon, and the like.

In the method of the present invention a heat transfer carrier gas is utilized to decrease the indirect and/or direct cooling time necessary in cyclic adsorption processes, thus intensifying the TSA process. For example, in the removal of oxygen required for the purification of liquid argon, the heat transfer carrier gas works as the heat transfer media to accelerate the cooling process and parts per million concentration levels of impurities of oxygen can be removed from a liquid argon feed stream efficiently and economically. This purification process can be integrated with an air separation plant or unit (ASU), under field service relevant conditions.

The heat transfer carrier gas or heat transfer gas employed in the embodiments of the invention improves thermal conductivity in the direct and/or indirect cooling of an adsorbent bed during the TSA cycling process. Thermal conductivity is the property of a material or gas to conduct heat or cold. More specifically, it is defined as the rate at which heat or cold is transmitted through a unit thickness of a material or gas in a direction normal to a surface unit area due to the unit temperature gradient under steady state conditions. One of the units thermal conductivity is measured in is milli watts/meter Kelvin, mW/(m K). The heat transfer carrier gas can be used in an indirect cooling process or direct cooling process to enhance heat transfer rate. The heat transfer carrier gas should be non-adsorbable or have minimal adsorbency on the adsorbent such that parasitic loading is minimized or eliminated. Additionally, the heat transfer carrier gas needs to be easily separable from the main stream to be purified.

Known methods that utilize cold argon gas or cold liquid argon experience parasitic loading of argon on the adsorbent, which can greatly decrease the capacity of the adsorbent to remove the oxygen impurity in an argon stream. "Air" or other process gas also has the disadvantage of getting adsorbed onto the adsorbent and decreasing the capacity of same. With helium's superior heat conductivity, very low boiling temperature (−268.9° C. or 4.25° K), inert behavior and relatively non-adsorbing property, it is particularly suitable to liquid phase separation under TSA process. However, other inert gases that do not adsorb onto the adsorbent and that exhibit favorable thermal conductivity improvements can also be utilized as heat transfer carrier gas.

In one embodiment, the heat transfer carrier gas employed to improve thermal conductivity should have a thermal conductivity value greater than or equal to 2.0 mW/(m K) measured at a temperature at 100K. In another embodiment the heat transfer carrier gas should have a thermal conductivity value greater than 6.0 mW/(m K) as measured at 100K, in another embodiment greater than 20 mW/(m K), in another embodiment greater than 30 mW/(m K), in yet another embodiment greater than 50 mW/(m K), and in another embodiment greater than 70 mW/(m K) as measured at 100K. Helium with a thermal conductivity value of 75.5 mW/(m K) at 100K is a preferred heat transfer carrier gas. Other non-limiting examples include, but are not limited to, hydrogen, neon, krypton, xenon, combinations and mixtures thereof, and the like. According to the invention, the time consuming regeneration steps of a TSA process can be significantly reduced allowing for the intensification of the TSA process. The intensified TSA process and method of the invention allows significant savings on both CAPEX and OPEX for a given TSA process, particularly, for liquid phase separation process operating under TSA mode.

A liquid cooling media generally employed to achieve cryogenic temperatures is liquid nitrogen (LIN), although other liquids can also be employed depending on cost and process objectives. Non-limiting examples include liquid oxygen, neon, hydrogen, helium, argon, and the like. Liquid nitrogen is a preferred cooling media.

The process and system of the invention can also be applied on gas phase separation/purification as long as there is an economic way to separate the helium gas, or other heat transfer gas employed to improve thermal conductivity, from the target gas product. Although the invention can be used to purify any fluid by the adsorptive removal of impurities from the fluid, it will be described in detail with the purification of a liquid crude argon stream by the removal of oxygen from the argon stream. The liquid argon feed to the purification process of the invention can come directly from distillation columns or from holding tanks. The invention is not limited to liquid argon purification, and it can be directly adapted to other liquid phase separation/purification. For example, the process and system of the invention can be usefully employed to purify a liquid nitrogen feed for the removal of, for example, O2. Also, it can be usefully employed to purify and enrich liquid xenon and/or krypton from oxygen feed, as well as for the removal of, for example, $N_2O$, $CO_2$, and THCs (total hydrocarbons). Additionally, the processes exemplified in the Figures are only examples to illustrate embodiments of the invention that utilize helium to enhance the heat transfer.

Argon is colorless, odorless, nontoxic as a solid, liquid, or gas and is chemically inert under most conditions. As an inert noble gas, it possesses special properties desirable for applications related to the semi-conductor industry, lighting, and other types of gas discharge tubes, welding and other high-temperature industrial processes where ordinarily non-reactive substances become reactive. Oxygen, in contrast to argon, is a highly reactive substance (in gaseous or liquid form) and is often a safety concern in that it supports combustion. Even low levels of oxygen (<100 parts per million) are not acceptable for certain laboratory and industrial processes. This also includes the chemical processing industry where certain reactions must be carried out primarily in the absence of oxygen. Successful development of a cyclic adsorption process to achieve removal of low concentrations (i.e., in the range of parts per million) of oxygen from liquid argon, requires the identification of a suitable adsorbent as well as the development and optimization of the adsorption process steps. The purified liquid argon product should contain at most 10 parts per million of oxygen, and preferably less than or equal to 1 part per million of oxygen while the quantity of oxygen in the liquid feed is usually between 10 and 50,000 parts per million, in another embodiment 10-30,000 parts per million, and in another embodiment 10-10,000 parts per million.

Production of liquid argon via cryogenic distillation is well known and is the preferred method of producing high purity argon. Cost considerations for the purification of argon have been a driving influence in the development of special cryogenic systems over at least several decades, and finding a suitable process which is robust, reliable, and meets the economic criteria necessary for customer demand has been sought.

Adsorption processes have also been described for the purification of argon, however, these have in general been limited to gas phase using 4A adsorbents and involved expensive energy intensive adsorption processes. For example, considerable cost is added to the adsorption process whenever an evacuation step is required. The adsorption process step of regeneration that requires vacuum has been historically very energy intensive in that vacuum processing requires special equipment and other additional peripherals leading to much higher energy demands as well as the addition of undesirable but necessary capital and operating expenses. The process of the present invention is generally conducted at pressures of from about −5 psig to about 350 psig, in another embodiment from about −5 to about 100 psig, in another embodiment from about −5 to about 75 psig and in yet another embodiment from about −5 to about 5 psig. The process of the present invention represents a significant improvement over prior art processes. The present invention contemplates two main embodiments for intensifying a TSA process through utilization of a heat transfer carrier gas. One employs indirect cooling of the adsorbent bed in a helium environment wherein heat is removed indirectly from the adsorbent bed primarily by a coolant, and the other employs direct cooling of the adsorbent bed using a cold helium stream. Various combinations of these embodiments are also within the purview of the present invention.

1. Indirect Cooling with LIN in the Outer Jacket and Helium in the Inner Adsorbent Vessel In this embodiment the process steps for adsorptive LAR purification with indirect cooling are shown in FIG. 1.

a) supplying liquid argon feed to the inlet of the adsorption bed that contains oxygen in the concentration range of about 1 to 10,000 parts per million, adsorbing at least part of the oxygen on the adsorbent thereby producing a purified liquid argon product leaving said adsorbent bed from the outlet with less than or equal to 1 parts per million of oxygen;

b) draining from the outlet or inlet of said adsorbent bed residual liquid argon while optionally supplying an argon purge stream at the inlet or outlet of said adsorbent bed while maintaining the adsorbent bed at temperature below 120 K;

c) supplying a nitrogen purge at the inlet or outlet of the adsorbent bed and allowing said adsorbent bed containing said adsorbent to warm to a predetermined temperature of at least 200 degrees Kelvin, preferably near ambient temperature, desorbing at least part of the adsorbed oxygen and removing this from the outlet or inlet of said adsorbent bed and;

d) supplying a gaseous helium purge of at least 200 degrees Kelvin, preferably near ambient temperature, at the inlet or outlet of the adsorbent bed, so that the gaseous effluent at the outlet or inlet side of said adsorbent bed is predominantly helium and;

e) indirectly cooling said adsorbent bed containing adsorbent, wherein said adsorbent is maintained under helium environment at a predetermined pressure range of about −5 psig to about 350 psig, preferably at a pressure range above ambient pressure during the indirect cooling of said adsorbent, to a temperature sufficient to sustain argon in liquid form;

f) wherein said process steps (a)-(e) are repeated in a cyclical manner.

Alternatively, indirect cooling to an intermediate temperature approximately 150 K can be conducted under helium atmosphere with liquid nitrogen as indirect coolant, followed by directly cooling the adsorbent with liquid product. This is exemplified by alternative steps e) and f), below.

e) indirectly cooling said adsorbent bed containing adsorbent and having an inlet and an outlet and maintaining the adsorbent bed under helium environment at a predetermined pressure range of about −5 psig to about 350 psig, preferably at a pressure range above ambient pressure during the indirect cooling of said adsorbent to a temperature of less than about 150 degrees Kelvin using liquid nitrogen;

f) directly cooling said adsorbent bed with purified liquid argon from the inlet or outlet of the adsorbent bed to a temperature such that said adsorbent bed sustains an argon feed in a liquid phase;

g) wherein said process steps (a)-(f) are repeated in a cyclical manner.

The adsorbent vessel can be a jacketed vessel or any other vessel capable of indirect cooling. The adsorbent is located in the inner vessel and the cooling media, i.e. liquid nitrogen, LIN, is circulated through the outer vessel. The adsorbent is cooled down indirectly through the jacket after the regeneration step and helium sweep step. During the indirect cooling through jacket, helium is maintained in the inner vessel for two main reasons: to enhance the heat transfer process due to superior heat conductivity of helium and to maintain positive pressure in the inner vessel to avoid the potential leaks. Previous processes did not contemplate maintaining positive pressure within the adsorbent vessel in order to mitigate vacuum formation, which is detrimental for the heat transfer process and increases the potential for leaks.

2. Direct Cooling with Helium to the Adsorbent Vessel

Figure 2A:
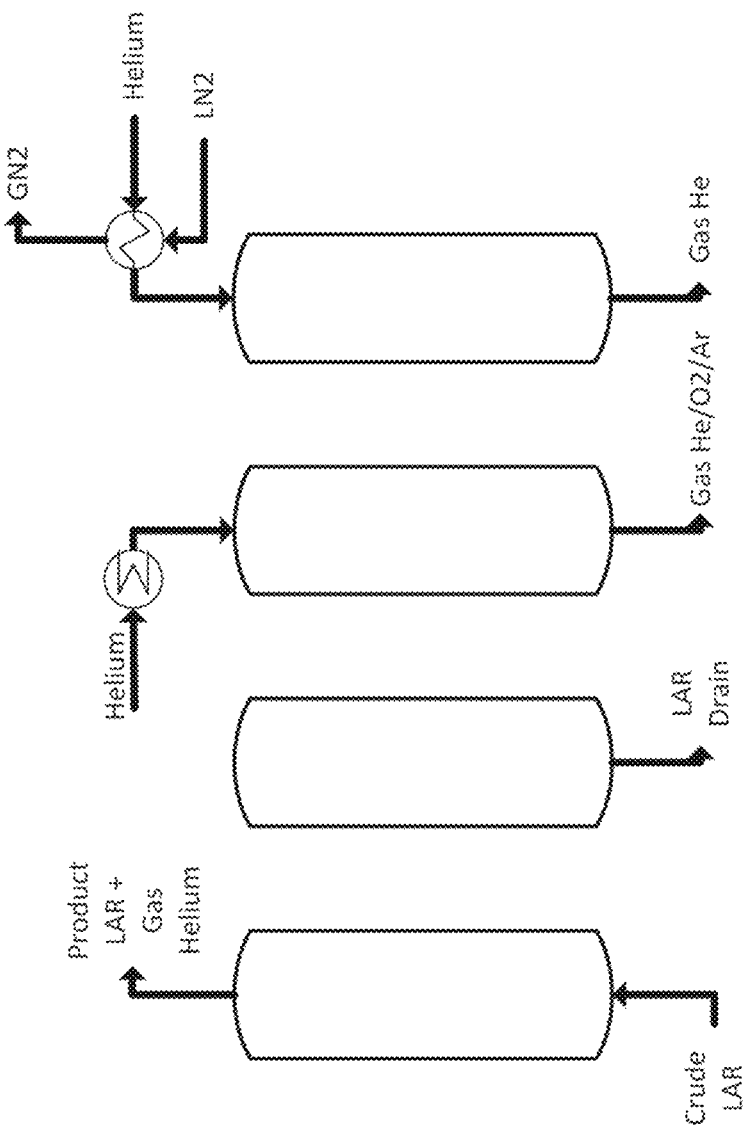
FIG. 2a illustrates a helium enhanced TSA process for LAR purification

In this embodiment, the invention relates to a direct helium cooling and warming method in a TSA process. This approach does not require a jacketed vessel since direct contact will be given to the cooling media, such as helium, with the adsorbent. Cold gas helium is obtained through heat transfer with LIN in a heat exchanger. A typical TSA process with direct helium warming and cooling in accordance with the invention is illustrated in FIG. 2a and comprises the following steps:

a) supplying liquid argon feed containing oxygen in the concentration range of about 1 to 40,000 parts per million to the inlet of the adsorbent bed, adsorbing at least part of the oxygen on the adsorbent thereby producing a purified liquid argon product leaving said adsorbent bed from the outlet with less than or equal to 1 parts per million of oxygen;

b) draining from the outlet or inlet of said adsorbent bed residual liquid argon while optionally supplying an argon purge at the inlet or outlet of said adsorbent bed while maintaining the adsorbent bed at temperature below 120 K;

c) supplying a helium purge at the inlet or outlet of the adsorbent bed and allowing said adsorbent bed containing said adsorbent to warm to a predetermined temperature of at least 200 degrees Kelvin, desorbing at least part of the adsorbed oxygen and removing this from the inlet of said adsorbent bed, so that the gaseous effluent at the outlet or inlet side of said adsorbent bed is predominantly helium, the effluent helium gas is recycled to helium recovery system to recover the helium and;

d) directly cooling said adsorbent bed containing adsorbent and having an inlet and an outlet with cold helium to a temperature sufficient to cool said adsorbent bed to a temperature sufficient to maintain argon in liquid form, wherein said cold helium is maintained at a positive pressure in said adsorbent vessel containing said adsorbent bed during the direct cooling process;

e) wherein said process steps (a)-(d) are repeated in a cyclical manner.

With liquid phase separations, a drain step can be added after step a), to drain out any liquid residues left inside the void space of the adsorbent vessel.

Figure 2B:
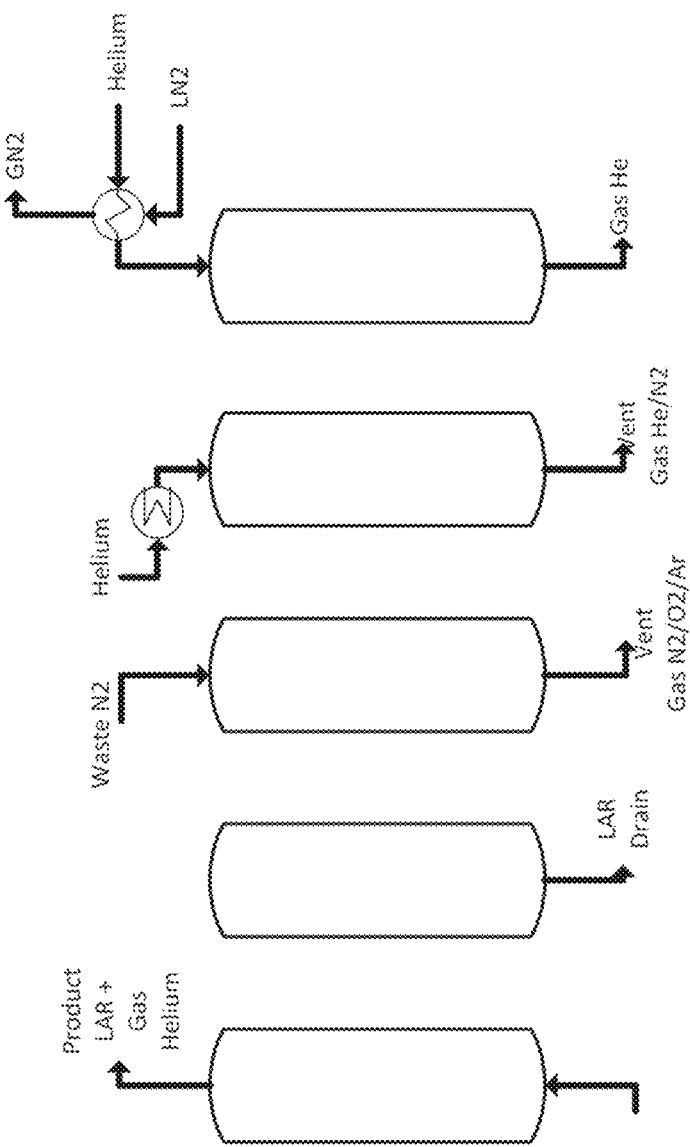
FIG. 2b illustrates a helium enhanced TSA process for LAR purification with waste nitrogen purge.

Helium used in the TSA process of the invention can be recycled to a purifier such as adsorptive, membrane or hybrid system for recovery and reuse as shown in U.S. Pat. No. 7,294,172. Depending on the cost of adding the helium recovery system, modifications of the above cycles can be made to use warm nitrogen or other gas stream as the purge gas to warm up the bed after drain step and to use helium gas to sweep the nitrogen gas or other gas stream out from the adsorbent bed before the cooling step. This embodiment is shown in FIG. 2b wherein helium is used to sweep out the nitrogen molecules left inside the adsorbent vessel. A summary of the process steps follows.

a) supplying from the inlet of an adsorbent bed liquid argon feed that contains oxygen in the concentration range of about 1 to 50,000 parts per million, adsorbing at least part of the oxygen on the adsorbent thereby producing a purified liquid argon product leaving said adsorbent bed from the outlet with less than or equal to 1 parts per million of oxygen;

b) draining from the outlet or inlet of said adsorbent bed residual liquid argon while optionally supplying an argon purge at the inlet or outlet of said adsorbent bed while maintaining the adsorbent bed at temperature below 120 K;

c) supplying a nitrogen purge at the inlet or outlet of the adsorbent bed and allowing said adsorbent bed containing said adsorbent to warm to a predetermined temperature of at least 200 degrees Kelvin, desorbing at least part of the adsorbed oxygen and removing this from the outlet or inlet of said adsorbent bed and;

d) supplying a gaseous helium purge of at least 200 degrees Kelvin at the inlet or outlet of the adsorbent bed, so that the gaseous effluent at the outlet or inlet side of said adsorbent bed is predominantly helium and;

e) directly cooling said adsorbent bed containing adsorbent and having an inlet and an outlet with cold helium, to a temperature of 120 K or as low as liquid argon temperature;

f) wherein said process steps (a)-(f) are repeated in a cyclical manner.

The helium sweep can be vented out to atmosphere or it can be recovered if a recovery system is available. The cold helium in step (e) above can be provided by indirectly cooling a helium stream in closed loop against liquid nitrogen or nitrogen vapor or both. The closed loop circuit can be configured to have purge capability to prevent build-up of undesirable components in the circulating helium stream, as well as provisions for make-up helium. Additionally cold helium can be provided at a constant temperature during the entire direct cooling of said adsorbent bed, or at progressively colder temperatures.

The direct cooling method does not require a jacketed vessel, CAPEX savings. More specifically, indirect cooling with a jacketed vessel constrains the choice of adsorbent vessel diameter. With direct cooling, vessel diameter is not limited allowing for more capacity for oxygen removal. Additionally, the cooling process can be intensified from mainly heat conduction to heat convection.

The flow direction in either embodiment is not limiting and the feed flow can be any direction, i.e., from the top or the bottom sides or any of the sides of the adsorbent vessel. Additionally, the direct inert gas/helium warm and cool flow to the adsorbent bed is not limited to countercurrent flow and can be any direction as desired. The TSA process of the invention is not limited to 2-bed system. It can be one bed system with buffer tank to temporally store the crude during the time the bed is in regeneration, or it can be a multi-bed system with 2 or more beds. In one embodiment, the process is continuous and, therefore, the system requires at least two adsorbent beds; one of which carries-out the adsorption or purification step while another bed is being regenerated in preparation for a further adsorption or purification step. The choice of the number of beds required to keep the system operational and efficient is not limited and is dictated by system installation and process requirements and/or dictated by customer or application needs.

Regardless whether direct and/or indirect cooling is employed, the process of the invention includes several distinct steps which are operated in sequence and repeated in a cyclical manner. Those steps are described in more detail below.

Purification or Adsorption Step

Impure (oxygen containing) cryogenic liquid argon is contacted with adsorbent during the purification or adsorption step, whereupon the oxygen impurities are substantially adsorbed by the adsorbent and a purified liquid argon product is obtained. The purification step takes place at or below critical cryogenic temperatures to ensure the liquid state of argon feed persists at pressures in the range of 20-150 psig. However, purification at pressures higher than 150 psig, caused by a hydrostatic head pressure gain or pressurization of the feed using rotating equipment or a combination thereof, is an alternative way of practicing this invention. The oxygen level in the impure cryogenic liquid argon feed can range from as low as 10 parts per million to one or more thousand parts per million (preferably not more than 50,000 parts per million). The liquid argon feed is introduced at the top or bottom of the adsorbent bed. The purified liquid argon, collected at the bottom or top of the bed, is then subsequently sent to a holding product tank. The purification step is completed once the oxygen level in the liquid argon product reaches the desirable purification level of less than or equal to 10 parts per million and preferably less than or equal to 1 part per million of oxygen in argon.

Draining Step

Next, the bed is drained to eliminate the liquid contained in the adsorbent bed prior to regeneration through the help of displacement gases. Exemplary examples of displacement gases that can be utilized include nitrogen, argon, helium, and purified air. After the draining of any residual cryogenic liquid is completed, the regeneration step can be initiated.

Regeneration

The bulk of the oxygen impurity adsorbed in the adsorbent is removed by increasing the temperature of the adsorbent and using a suitable purge gas. During this step, the temperature of the adsorbent bed increases as it is directly contacted with the purge gas until the bed temperature reaches at least 200 degrees Kelvin and more preferably around ambient temperature. Exemplary purge gases for the regeneration include nitrogen, argon, helium, purified air or mixtures of two or more of same. Nitrogen is a preferred purge gas for regeneration. In cases where nitrogen and/or argon are less readily available other gases can be used to purge the adsorbent bed and regenerate the adsorbent including mixtures of dry carbon dioxide and hydrocarbon free air or a mixture of nitrogen and oxygen. Regardless of the purge gas chosen, it should be moisture free. In one embodiment, the bed can be initially purged with nitrogen followed by an argon purge. In another embodiment helium is utilized after the initial nitrogen purge instead of argon. In another embodiment, helium is employed as the sole purge gas to warm the adsorbent bed. The helium can be a fresh supply or it can be recycled and purified helium from the indirect cooling step. The temperature of the purge gas is at least 200 degrees Kelvin and more preferably near ambient temperature, while the pressure is at least 2 psig and more preferably at least 15 psig. The temperature of the purge gas could be higher than ambient temperature, with the proviso that the porous adsorbent has enough thermal stability to withstand a higher temperature purge.

In another embodiment, the purge gas is introduced from the outlet portion towards the inlet portion of the bed, in a direction countercurrent to the liquid feed stream. Purging the bed from the inlet to the outlet portion, in the same direction as the flow of the liquid to be purified are alternative embodiments which can accomplish similar results, with the proviso that the bed is below the fluidization limit or that the adsorbent and the bed is fully contained.

Indirect Cooling

At the end of the regeneration step, the adsorbent bed reaches a temperature of at least 200 degrees Kelvin, and more preferably around ambient temperature. To proceed to the next purification cycle, the bed needs to be cooled to a temperature below the argon boiling point. One way to achieve this is via indirect cooling, i.e. by flowing liquid nitrogen (at a pressure ranging from about 18-30 psig) or cold gaseous nitrogen or liquid argon or other cooling media through a jacket surrounding the adsorbent vessel until the bed temperature, as measured at the center of the bed, has reached the preferred temperature. The adsorbent vessel is designed based on the indirect cooling time for a specific vessel diameter to ensure heat transfer from the jacket to the inner of adsorbent bed. Indirect cooling of the adsorbent bed to a specified temperature, at least about 150K, prior to bringing the cryogenic liquid in direct contact with the adsorbent is critical to control the micro structure of the adsorbent and ensure that the capacity of the bed to remove $O_2$ is maximized. As previously mentioned, the poor heat conductivity of adsorbent material generally constrains the process cycle time, adsorbent vessel diameter and restricts process intensification.

The present inventors have discovered that the thermal conductivity during the indirect cooling step can be dramatically increased by introducing helium into the adsorbent vessel as described herein. More specifically, after the warm purge of the adsorbent bed, any residual gas molecule from the purge step can be swept out with a helium sweep. If helium is utilized as the sole purge gas, the helium sweep step can obviously be omitted. A helium recovery system can be added to recover helium from the waste effluent. Once the adsorbent is free from residual gas molecules, helium gas is introduced to the adsorbent vessel at just above ambient pressure (~5 psig) to fill in the void space of the adsorbent bed. Introducing helium in order to fill the void space and maintaining same during the indirect cooling step not only improves thermal conductivity, it also reduces the risk of leaking due to vacuum since positive pressure is maintained in the adsorbent vessel.

After helium is added to the adsorbent bed in an amount sufficient to maintain a positive pressure inside the bed (~5 psig) or simultaneous with the addition of helium, indirect cooling is initiated by sending liquid nitrogen or other cooling media to the jacket surrounding the adsorbent bed. A circulating media could be used to create a flow of helium with minimum helium consumption and better heat transfer effect to take the advantages of both indirect and direct cooling. Because helium will not condense and adsorption is minimal at the process temperature (~90K), the helium is in vapor phase and naturally separates from liquid argon product, and can be vented from the top of the liquid argon storage tank. Helium consumption is dependent on the void space of the vessel and piping before or after the valves up or down stream. Introducing helium in the adsorbent vessel in this fashion improves the heat conductivity during the indirect cooling step by a factor of up to 10. This dramatic improvement in heat transfer time significantly reduces the time necessary for cooling down from ambient temperatures to cryogenic temperatures during the indirect cooling step. The helium used can be recovered, recycled and purified to remove any impurities for next continuous usage.

Direct Cooling

During the direct cooling step, the bed is cooled to approximately 90 degrees Kelvin by flowing liquid argon directly through the bed. This liquid argon stream could either be obtained from the impure liquid argon feed or from a portion of the purified liquid argon product, depending on the choice of design of the process. The subsequent purification step can be initiated once the bed has reached a temperature of 90 degrees Kelvin. With helium enhanced heat transfer during the indirect cooling step, it is possible, and in some situations preferable to indirectly cool the adsorbent bed all the way to the process temperature around 90 degrees Kelvin and minimize or eliminate direct cooling with liquid argon product entirely.

Alternatively, indirect cooling can be omitted entirely and the cold helium can be employed as the cooling media to directly cool the adsorbent. More specifically, warm helium is first sent directly to the adsorbent bed to warm up the adsorbent and purge out the adsorbate and release the adsorbent capacity. Then cold helium is sent directly to the adsorbent to cool down the adsorbent to the separation process temperature for next cycle.

It should be understood that the process described above often will include two or more adsorbent beds, wherein the process for purifying liquid argon in each bed is offset from one another. Specifically, for instance, when one adsorbent bed is being provided feed gas, a second adsorbent bed can be regenerating. If the process utilizes four beds then the third adsorbent bed may be idle, and the fourth adsorbent bed may be cooling.

The development of a preferred cyclic cryogenic adsorption process depends to a high degree on the ability to warm and cool the adsorbent bed within a specified and optimal time period. It will be understood by those skilled in the art that for a two-bed process, the time to drain the adsorbent bed and the heating (for adsorbent regeneration) and cooling time period also provides a key process variable and time frame for the "on-line time" of each adsorbent bed. Furthermore, it is desirable from a process and economics standpoint to not cycle each bed very frequently. The preferable online time requirement for each bed is at least 3 hours and more preferably, from around one to seven days, depending on the plant and vessel designs and the adsorbent chosen.

In one embodiment the present invention relates to a TSA process that can be beneficially applied to argon purification processes for removing oxygen from liquid argon. The process generally comprises the following cyclical steps:

a) supplying the adsorbent bed with the liquid argon feed that contains oxygen, thereby producing a purified liquid argon product leaving the adsorbent bed with less oxygen than existing in the liquid argon feed;

b) draining the residual liquid argon and removing this residual out of the bed and;

c) allowing the adsorbent bed holding the adsorbent to warm to a temperature such that the adsorbent is regenerated to the point that the adsorbent bed can continue to remove the oxygen and continue to provide the purified liquid argon once the adsorbent bed is cooled down as described in step (d) below;

d) introducing helium to the adsorbent bed in an amount to substantially fill the void space of the bed and maintaining same during the indirect cooling step;

e) cooling an adsorbent bed holding adsorbent to a temperature such that the adsorbent bed sustains an argon feed in a liquid phase.

The process described above is a cycle operated in a fashion comprising steps (a)-(e) where the cycle is repeated, as needed, and the adsorbent bed contains zeolite adsorbents of either the 4A type zeolites or ion exchanged 4A type zeolites or both and where the ion exchange is accomplished with lithium ions. The adsorbents contained within the adsorbent beds are effectively regenerated to remove oxygen via desorption by warming the beds with various gases (e.g., nitrogen, argon or gas mixtures including purified air) at temperatures that may reach ambient conditions.

In another embodiment, the adsorption process for removing oxygen from liquid argon is described as follows:

a) supplying from the inlet of an adsorbent bed the liquid argon feed that contains oxygen in the concentration range of about 10 to 40,000 parts per million, adsorbing at least part of the oxygen on the adsorbent thereby producing a purified liquid argon product leaving the adsorbent bed from the outlet with less than or equal to 1 parts per million of oxygen;

b) supplying a nitrogen purge at the inlet or outlet of the adsorbent bed and draining from the outlet or inlet of the adsorbent bed residual liquid argon and;

c) continuing the nitrogen purge at the inlet or outlet of the adsorbent bed and allowing the adsorbent bed containing the adsorbent to warm to a temperature of at least 200 degrees Kelvin, desorbing at least part of the adsorbed oxygen and removing this from the outlet or inlet of the adsorbent bed and;

d) supplying a gaseous purge of argon and/or helium at a temperature of least 200 degrees Kelvin at the inlet or outlet of the adsorbent bed, so that the gaseous effluent at the outlet or inlet side of the adsorbent bed is predominantly argon and/or helium;

e) introducing helium to the adsorbent bed in an amount to substantially fill the void space of the bed and maintaining helium in the bed during the indirect cooling step;

f) indirectly cooling the adsorbent bed containing adsorbent, where the bed has an inlet and an outlet, as well as a direct and an indirect cooling means to a temperature below about 150 degrees Kelvin and;

g) directly cooling the adsorbent bed with liquid argon to a temperature such that the adsorbent bed sustains an argon feed in a liquid phase;

h) the process steps (a)-(g) are repeated in a cyclical manner.

The liquid argon utilized in the direct cooling step may be either a purified liquid argon stream or the crude liquid argon feed stream.

In another embodiment, the adsorption process for removing oxygen from liquid argon is described as follows:

a) supplying from the inlet of an adsorbent bed the liquid argon feed that contains oxygen in the concentration range of about 10 to 40,000 parts per million, adsorbing at least part of the oxygen on the adsorbent thereby producing a purified liquid argon product leaving the adsorbent bed from the outlet with less than or equal to 1 parts per million of oxygen;

b) supplying a helium purge at the inlet or outlet of the adsorbent bed and draining from the outlet or inlet of the adsorbent bed purified residual liquid argon and;

c) continuing the helium purge at the inlet or outlet of the adsorbent bed and allowing the adsorbent bed containing the adsorbent to warm to a temperature of at least 200 degrees Kelvin, desorbing at least part of the adsorbed oxygen and removing this from the outlet or inlet of the adsorbent bed, so that the gaseous effluent at the inlet side of the adsorbent bed is helium and;

d) introducing cold helium to the adsorbent bed to directly cool down the adsorbent to the separation process temperature for next cycle, i.e., such that the adsorbent bed sustains an argon feed in a liquid phase. Process steps (a)-(d) are repeated in a cyclical manner.

The economic advantages provided by the current invention include the reduction of capital cost of more conventional alternative technologies aimed at purifying liquid argon from oxygen impurities by use of adsorption processes. This reduction in capital cost is a result of the combination of an economically attractive adsorption process cycle, especially as it pertains to the regeneration step (e.g., elimination of any vacuum regeneration step), the use of helium to improve thermal conductivity during the indirect cooling step, and the use of a synthetic zeolite material that does not require expensive reducing agents (e.g., hydrogen) to be regenerated.

Although there are alternative process methodologies that could be used to practice the present invention, one preferred embodiment is discussed below, with reference to the FIG. 3. For purposes of explanation and simplicity, the use of a single adsorbent bed is described and shown in the FIG. 3. However, it will be understood by those skilled in the art, that the process described is applicable to processes that utilize two or more beds.

Figure 3:
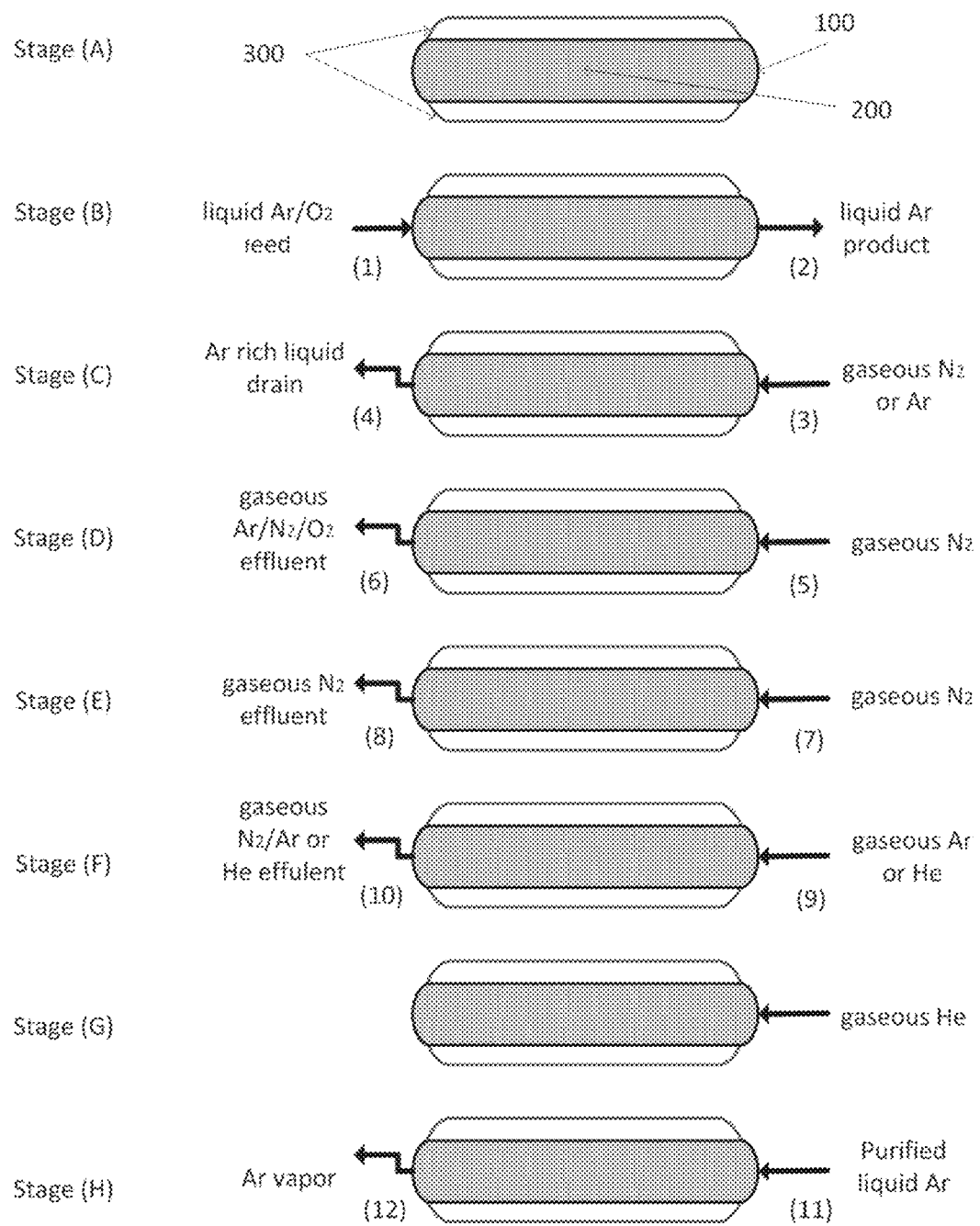
FIG. 3 illustrates the steps for a cyclic TSA process as provided in the exemplary embodiments of the present invention.

FIG. 3 describes the consecutive steps for a cyclic TSA process for LAR purification in accordance with the present invention. In the initial stage of set-up, the adsorbent bed (100) is tightly packed with adsorbent material (200). External cooling with liquid nitrogen or other cooling media is provided via a cooling jacket (300) that surrounds the bed. Stage (A) depicts the initial set-up arrangement prior to the beginning of purification, where the adsorbent bed is at about 90 degrees Kelvin. Stage (B) illustrates the purification step of the adsorption process. During Stage (B), the liquid argon stream containing oxygen is fed into the adsorbent bed as represented by the arrow (1). The feed is provided at either the bottom or the top of the bed. This feed stream (1) is liquid phase argon that contains oxygen impurities in the range of 10 to 10,000 parts per million of oxygen. The pressure within the bed during the introduction of the liquid argon feed is about 60 psig and the corresponding temperature for this exemplary embodiment ensured that the argon feed remained in the liquid phase at the respective process pressure conditions, namely a temperature of about 90 degrees Kelvin. The adsorbent is selected so that under the purification conditions, the absorbent is selective for oxygen. The liquid argon product stream (2) is collected at the top end or the bottom end of the bed. The purification step is completed once the level of oxygen in the liquid argon product reaches a concentration of 1 part per million. At this instance, the online bed should be prepared for regeneration and the second bed is brought online to perform the purification.

Prior to regeneration of the adsorbent, the liquid argon volume in the bed is drained as shown in Stage (C) at cryogenic temperature while maintaining liquid nitrogen in the cooling jacket. In order to ensure that the bed is drained properly and in a timely fashion, a cold purge step is provided using an inert displacement gas (normally argon or nitrogen) denoted as stream (3). The temperature of the displacement gas is about 90-150 degrees Kelvin, preferably 90-120 degrees Kelvin, while its pressure is preferably about 15 psig. The draining step is completed once all the liquid that was contained in the adsorbent bed is drained. The liquid drain stream (4), as provided and shown, is rich in liquid argon that remained contaminated with oxygen and collected at the bottom of the bed and can optionally be recycled. After adsorbent bed drain is completed, the liquid nitrogen is also drained from the cooling jacket and vented to the atmosphere.

After bed (100) is drained, the adsorbent is regenerated using a warm purge gas while the adsorbent remains within the same bed (100). As illustrated in Stages (D) and (E), a nitrogen purge through the bed is initiated in a concurrent or countercurrent fashion in relation to the feed (i.e. from the top portion to the bottom portion of the bed). The temperature and pressure of the nitrogen purge gas, stream (5) and (7), is about 300 degrees Kelvin and 15 psig, respectively. The effluent during the purge Stage (D), indicated as stream (6), is predominantly composed of undesirable oxygen contaminant, and some argon in the nitrogen purge gas. During this step, oxygen is desorbed from the zeolite adsorbent and some quantity of argon is desorbed as the temperature within the adsorbent bed rises. As the purging continues, and the bed temperature approaches the temperature of the purge gas (shown as nitrogen in stream (7)), the gaseous effluent, stream (8), becomes predominantly nitrogen (Stage (E)). The nitrogen purge is completed when the bed temperature reaches about 300 degrees Kelvin. At that point, the zeolite becomes loaded with nitrogen. For optimum performance most of the available sites of the adsorbent must be free and capable of capturing a majority of oxygen impurities. Hence, subsequent to the nitrogen gas purge, an argon gas or helium gas purge, indicated by the stream (9) shown, is initiated (Stage (F)). The temperature of the gaseous purge, whether argon or helium, is about 300 degrees Kelvin, while the pressure is around 15 psig. This is a very important step in the regeneration of the adsorption scheme. During the last part of the regeneration step, (Stage (F)), a gaseous effluent of comprising nitrogen and argon or helium exits the bed (100), indicated by stream (10). The argon or helium gas purge is completed when the effluent, stream (10) is predominantly argon or helium gas, depending of course on the purge gas utilized. At this instance, the argon (or helium) gas occupies the macropore space of the adsorbent particles as well as the void space between particles within the adsorbent bed. In one embodiment, helium is purge gas employed after purging with nitrogen.

After the argon and/or helium gas purge is completed, helium gas is introduced to the adsorbent vessel at just above ambient pressure (~5 psig) to fill in the void space of the adsorbent bed. It is preferred that positive pressure be maintained within the vessel during the entire indirect cooling step in order to minimize the risk of leaking. Indirect cooling of the adsorbent bed can then be initiated.

Cooling the adsorbent begins in Stage (G). During this stage, indirect heat transfer from a liquid nitrogen medium flowing in a jacket (300) surrounding the bed (100) cooled the adsorbent bed to approximately 120 degrees Kelvin. The pressure of the liquid nitrogen in the jacket is regulated so that the liquid nitrogen temperature is above the melting point of argon at the process conditions and below the saturation point of nitrogen. Once the temperature in the middle of the adsorbent bed is about 120 degrees Kelvin, the direct cooling step is initiated, as shown in Stage (H). This involves direct contact of the adsorbent material (200) with a purified liquid argon stream denoted stream (11). Stream (11) is introduced at the top or bottom of the adsorbent bed and it cools the bed to the desired temperature for purification of about 90 degrees Kelvin. This also facilitates building a liquid head to fill the adsorbent bed with purified liquid argon. At the end of this step the temperature at the middle of the bed is about 90 degrees Kelvin and the pressure is around 60 psig. Preferably, the adsorbent bed (100) can be indirectly cooled to about 90 degrees Kelvin under helium environment, and direct cooling with purified liquid argon stream is avoided. This allows for the next purification cycle to begin again at Stage (B).

Adding helium to the adsorbent vessel prior to the indirect cooling step significantly improves heat transfer and reduces risk of piping leaks. More particularly, the helium dramatically improves thermal conductivity during the indirect cooling step which significantly reduces the heat transfer time needed during cooling down from ambient temperature to cryogenic temperature. This enables process intensification for reducing vessel size and hence capital costs. Utilizing helium also reduces the risk of leakage and improves the overall reliability of the operation. More specifically, valves are located at several different locations up or down stream of the adsorbent vessel. Those valves as well as other connections are potential leak points during the indirect cooling period in processes which create a vacuum inside the adsorbent bed. Any leak into the adsorbent bed will detrimentally affect the $O_2$ capacity on the adsorbent, therefore reduce or even terminate the performance in terms of $O_2$ removal from LAR. Maintaining a helium atmosphere in the vessel during the indirect cooling step, protects the adsorbent from leaks and air infiltration, reduces the risk of adsorbent contamination, and increase the process reliability from an operations standing point. Additionally, because a vacuum is not created, the need for special equipment and peripherals is eliminated and operating expenses are reduced.

In one embodiment a full TSA purification cycle according to the invention comprises:
 (i) providing the adsorbent bed with either virgin or regenerated adsorbent—Stage (A)
 (ii) purification of the liquid argon feed providing purified liquid argon product—Stage (B)
 (ii) drainage of the liquid argon contained in the bed at the end of purification step—Stage (C)
 (iii) regeneration of the adsorbent via warm-up—Stages (D), (E), and (F) and;
 (iv) adding helium gas to the adsorbent vessel followed by cool-down of the adsorbent bed—Stages (G) and (H) so that the cycle can be repeated.

The adsorbent is chosen depending on the liquid stream to be purified and the impurity that is to be removed. If argon is the feed to be purified, the proper adsorbent which will adsorb, at most, very small amounts of argon. The ideal adsorbent does not adsorb any argon and also removes impurities from the argon which are predominantly oxygen impurities. However, in practice, the adsorbents that have been used still have some argon uptake capacity. Herein are described adsorbents specifically designed to minimize argon uptake.

U.S. patent application 2014/0249023, which is incorporated herein by reference describes adsorbents for purification of liquid argon. The adsorbents preferred for the present invention are primarily beads (with predominantly spherical particle geometry) with an average particle size of less than or equal to 2.0 mm and more preferably less than or equal to 1.0 mm. Additionally, the desired adsorbents have a porosity that is in a range of between 33 and 40 percent as measured by mercury (Hg) porosimetry. A binder is used to formulate the beaded adsorbent, such that the binder is present at no greater than 15 weight percent. This binder is preferably purified versions of attapulgite, halloysite, sepiolite or mixtures thereof.

Testing to establish the viability of this purification cycle was performed in a pilot plant which included an adsorbent bed with a tube-in-tube type cooling system. The inner tube, which had an outside diameter of one inch, was packed with the adsorbent. The outer jacket was utilized for passive cooling. The length of the bed was either one foot or three feet. This bed allowed for receiving cryogenic liquid flow into an inlet section and the delivery of a cryogenic liquid product at the outlet. The bed was regenerated on-line as is described above.

Compared with previously proposed indirect cooling TSA processes for liquid argon purification, the present invention alleviates many of the restrictions on the adsorbent vessel design in terms of vessel diameter. The claimed method can also accommodate increased feed flowrates and/or higher $O_2$ impurity levels in crude argon feed and enables TSA process intensification, i.e., a smaller vessel can be utilized due to a more rapid process cycle.

The invention will now be illustrated by the following non-limiting examples.

Example 1

Figure 4:
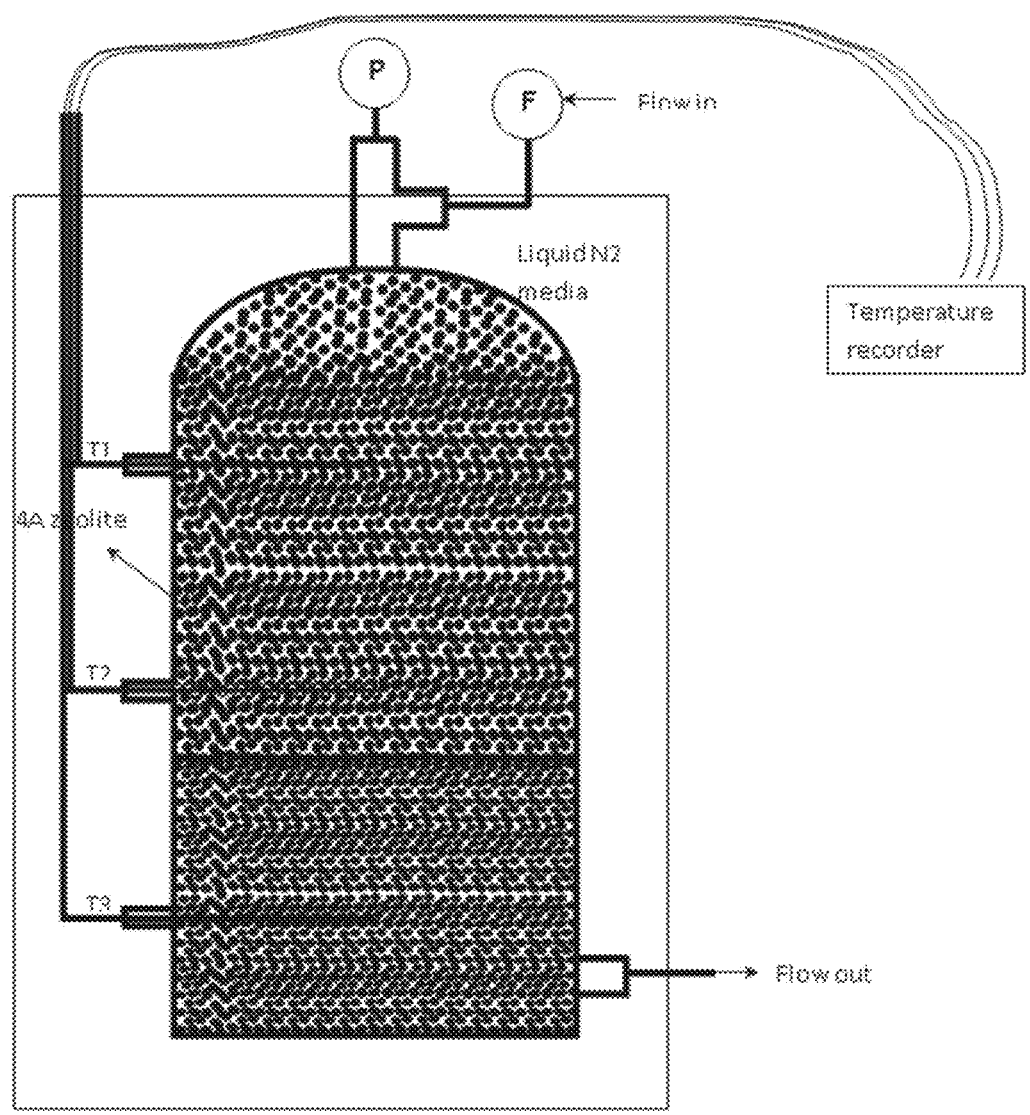
FIG. 4 depicts an experimental system for heat transfer measurement in packed bed, wherein P: pressure transducer, F: mass flow meter, T1-T3: thermocouples.
Figure 5:
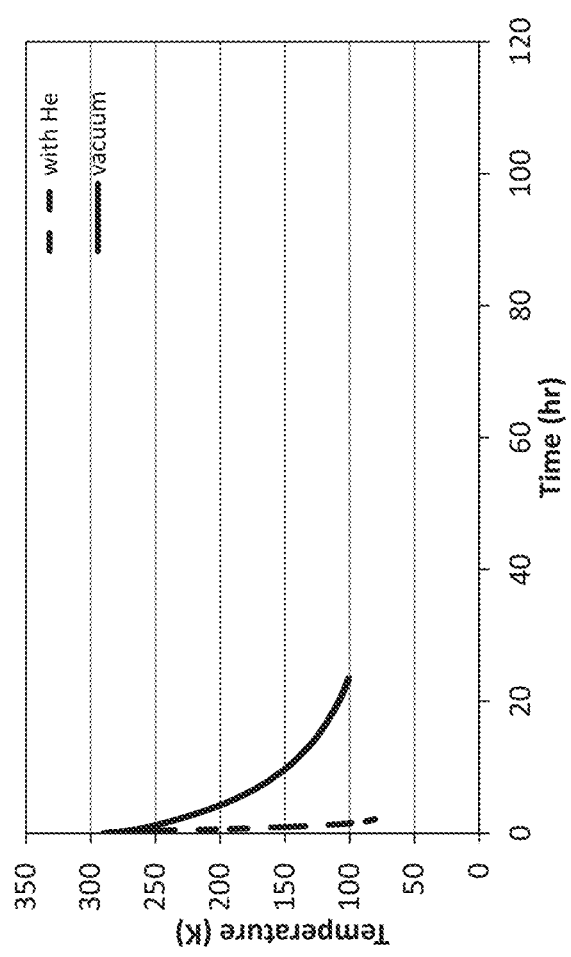
FIG. 5 shows the experimental results of cooling down an adsorbent bed at different conditions with a vessel internal diameter (ID) of 5.3 inches.

As shown in FIG. 4, an experimental system was set up to measure the indirect cooling down temperatures vs. time at different conditions. A 5.3" ID vessel packed with 4A zeolite adsorbent materials was embedded with thermocouples at three different locations (top, middle and bottom) as illustrated in FIG. 4. Those thermocouples were positioned in the center of each location. A pressure transducer was placed inside the adsorbent vessel to measure the pressure changes during the adsorbent indirect cooling process. For comparison, the temperature decrease with time during the indirect cooling process from ambient temperature to around 100 Kelvin was measured and recorded under both vacuum environment and helium environment. The measured temperatures (center of the adsorbent vessel T2 vs. time results were recoded and reproduced in FIG. 5. The results indicated that for a 5.3 inches ID adsorbent vessel, cooling down the adsorbent from ambient to about 100 Kelvin under vacuum condition (0.04 psia) will take 23.5 hours; however, this cooling down process with helium filled the adsorbent vessel will only take about 1.5 hours, which reduced the cooling down time roughly 15 times. This result matches the simulation results shown in FIG. 6 which indicate similar indirect cooling time reduction for adsorbent vessel at different diameters.

Figure 6A:
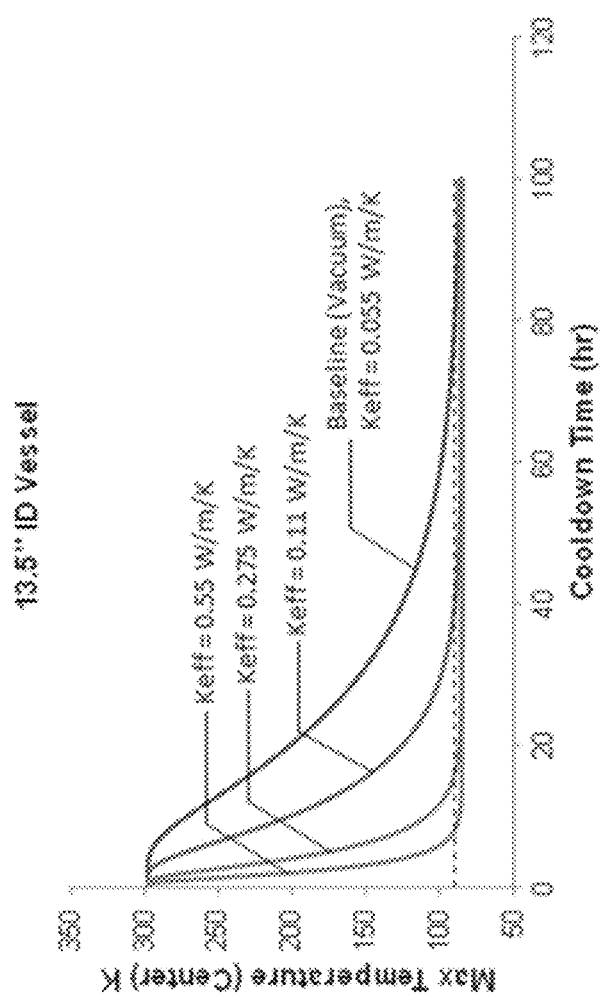
FIGS. 6a and 6b illustrate the cooling down of adsorbent bed at different thermal conductivity and vessel diameters of 13.5 inches and 17.5 inches.
Figure 6B:
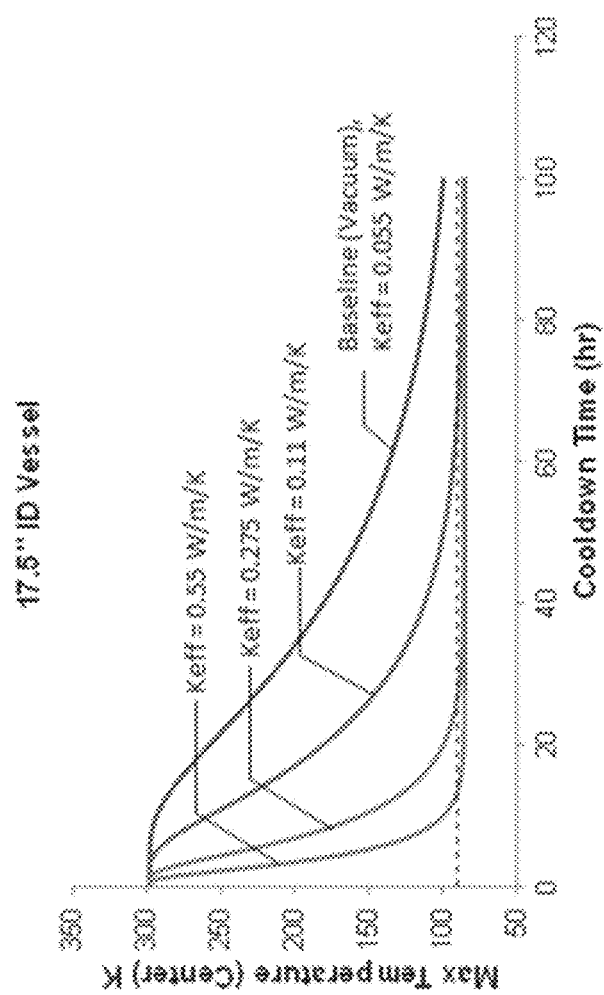

FIG. 6 compares simulation results of cooling down times for adsorbent vessels of 13.5 inches ID and 17.5 inches ID with the technology of the present invention vs. prior designs that do not utilize a helium atmosphere in the adsorbent vessel. As the data show, the cooling time in the indirect cooling step is significantly reduced compared to prior designs that do not utilize a helium atmosphere in the adsorbent vessel. The curves in FIG. 6 are parametric in heat conductivity relative to baseline (vacuum) with the faster cool down curve representing a factor of 10 increase in thermal conductivity (Keff=0.55 W/m/K) versus vacuum (Keff=0.055 W/m/K). For example, as shown in FIG. 6, the cooling down time from 300 K to 90 K for a 13.5 inches ID vessel is reduced from over 90 hours to less than 20 hours. This significantly reduces liquid nitrogen consumption and dramatically improves process efficiency in that the data suggest that utilizing helium during the indirect cooling step can reduce the cycle time by 50% or more, allowing one to reduce vessel size and/or increase flow rate.

As the data demonstrate, utilizing helium in the direct cooling and warming step significantly reduces the heat transfer time needed during warm regeneration and pre-cooling, enabling process intensification for reducing vessel size and capital savings.

As described previously in U.S. patent application 2014/0245782, which is incorporated herein by reference, the intent of integrating adsorptive LAR purification technology into distillation process as a hybrid method of producing product argon is to optimize the overall argon production economics. The overall coldbox space is drastically reduced due to superstaged column reduction and the oxygen impurities left will be removed through using adsorptive system. For a designed productivity ASU plants with integrated adsorptive LAR purification process, it is desirable to minimize the size of the overall hybrid system by reducing both sizes of superstaged distillation column and adsorptive system. Given a fixed production rate of ASU, the less the oxygen impurity the superstaged column needs to remove, the more coldbox space will be saved. On the other hand, the higher oxygen impurity the adsorptive system has to remove, the bigger the adsorptive system will need to be. For those who are familiar with the art, it is desirable to minimize the relative high unit cost of the coldbox, and maximize the adsorptive system capacity for oxygen removal. Therefore, it is desirable to minimize adsorptive system so as to keep the adsorptive LAR purification system capital and operation cost minimal.

The size of the adsorptive LAR purification system depends on key process parameters such as crude argon feed flow to the adsorptive system, oxygen impurity level within the crude argon feed, adsorbent bed on stream time to make argon product and cooling method in the TSA process. Any intensification of the process is almost always beneficial from capital standpoint.

Table 1 compares some adsorptive LAR purification system under various process conditions. Two types of plants are illustrated here. One is an intermediate ASU plant with crude LAR flow at 32 KCFH to the adsorptive system (Plant 1), and the other one is a large ASU plant with crude LAR flow at 52 KCFH to the adsorptive system (Plant 2). Various oxygen impurity levels (1000 and 40,000 ppmv) are considered to be removed in the adsorptive LAR purification system. From Table 1, it can be seen that, if indirect cooling under vacuum is applied in the TSA process, according to heat transfer modeling results shown in FIG. 6, the maximum adsorbent vessel diameter is limited to around 13.5 in. (maximum diameter for indirectly cool down the adsorbent in 2 days), the cooling down time is estimated for more than 1 day to reach less than 150 degree Kelvin before product LAR can be used to directly cool down the adsorbent further to around 90 degree Kelvin as shown in the process in US patent application 2014/0245781. Therefore the entire regeneration time is estimated at 2 days (drain+warm purge+cooling). Those requirements set the adsorbent vessel length at 15 ft. However, with indirect cooling under helium for enhancing the heat transfer according to the present invention, the cycle time can be dramatically reduced. If the bed on stream time is cut from 2 day to 1 day, the vessel length is reduced to half, enabling significant capital savings on adsorbent vessels and process design.

To further reduce the superstaged column coldbox space, if high oxygen impurity at 40,000 ppmv is sent to the adsorptive system, from results shown in Table 1, it can be seen that it will be impractical to use adsorptive LAR purification system to completely remove the oxygen impurity to product grade due to the length of the adsorbent vessel needed, i.e., approximately over 84 ft. However, using direct cooling according to this invention, adsorbent vessel diameter can be increased to around 6 ft. allowing the vessel length to be reduced down to about 15 ft.

For larger plants such as plant 2, with high crude argon feed flowrates to the adsorbent vessel and oxygen impurity level of 1000 pm in the feed, the indirect cooling with helium method of this invention enables one to reduce vessel length to one third, compared with the case of indirect cooling under vacuum. This is because the indirect cooling time under helium is much faster than the case of under vacuum as shown in FIG. 6. So the TSA process is significantly intensified by reducing the time limiting step, i.e. the indirect cooling step. In larger plants such as plant 2 with high crude argon feed flows to the adsorbent vessel, and oxygen impurity levels at 40000 pm in the feed, previous methods with indirect cooling under vacuum are impractical due to the length of the adsorbent vessel needed, i.e., approximately over 813 ft. Even with indirect cooling under helium with cooling down time less than 10 hours, still has the limitation of vessel diameter at 17.5 in. as indicated in FIG. 6, which will lead to impractical vessel length of 136 ft. If direct cooling according to the present invention is used, the adsorbent vessel diameter limitation is removed due to the heat transfer in cooling process change from heat conduction to heat convection. Therefore the vessel diameter can be increased freely to around 6 ft. for example, allowing the vessel length to be reduced down to about 24 ft.

TABLE 1

Comparison of adsorbent vessel sizing with different TSA process

| | Plant 1 | | | | | Plant 2 | | | | |
|---|---|---|---|---|---|---|---|---|---|---|
| Feed Flowrate (KCFH, NTP) | 32 | | | | | 52 | | | | |
| O2 Impurity (ppmv) | 1,000 | | 40,000 | | | 1,000 | | 40,000 | | |
| TSA Cooling method | Indirect cooling (under vacuum) | Indirect cooling (under helium) | Indirect cooling (under vacuum) | Indirect cooling (under helium) | Direct cooling (under helium) | Indirect cooling (under vacuum) | Indirect cooling (under helium) | Indirect cooling (under vacuum) | Indirect cooling (under helium) | Direct cooling (under helium) |
| Bed on Stream Time (day) | 2 | 1 | 2 | 0.5 | 1 | 3 | 1 | 3 | 0.5 | 1 |
| Vessel ID (in) | 13.5 | 13.5 | 13.5 | 17.5 | 59 | 17.5 | 17.5 | 17.5 | 17.5 | 59 |
| Vessel Length (ft) | 20 | 10 | 563 | 84 | 15 | 29 | 10 | 813 | 136 | 24 |

Also, with more rapid cycle, the argon parasitic loading on the adsorbent materials becomes negligible due to slow argon uptake rate on the adsorbent. This allows for conventional 4A zeolite (NaA) to be used as the adsorbent materials instead of more expensive lithium exchanged 4A adsorbents required by many known processes.

Various modifications and changes may be made with respect to the foregoing detailed description and certain embodiments of the invention will become apparent to those skilled in the art, without departing from the spirit of the present disclosure.

We claim:

1. A method of intensifying a temperature swing adsorption process for removing impurities from a liquid phase stream, which comprises at least one adsorbent bed, wherein said method comprises maintaining said adsorbent bed in an environment of at least one heat transfer gas during the cooling of said adsorbent bed to cryogenic temperatures, to sustain the liquid feed in a liquid phase, wherein said heat transfer gas has a thermal conductivity value greater than or equal to 2.0 mW/m K measured at a temperature of 100K.

2. The method of claim 1 wherein said at least one heat transfer gas accelerates the cooling of said at least one adsorbent bed through conductive heat transfer, convective heat transfer, or both conductive and convective heat transfer.

3. The method of claim 1 wherein said at least one heat transfer gas comprises at least one of helium, hydrogen, neon, krypton, xenon, or combinations and mixtures thereof.

4. The method of claim 1 wherein said heat transfer gas comprises helium.

5. The method of claim 1 wherein said adsorbent bed is located in an adsorbent vessel comprising an outer jacket for cooling media and an inner vessel containing said adsorbent bed, wherein said cooling media indirectly cools down the adsorbent bed in said inner vessel, wherein helium is loaded into said inner vessel in an amount effective to substantially fill the void space of said inner vessel during the indirect cooling of said adsorbent bed.

6. The method of claim 5 wherein the cooling media in said outer jacket is liquid nitrogen.

7. The method of claim 1 wherein said temperature swing adsorption process is a liquid argon purification process or a gas phase argon purification process, and the impurity to be removed is oxygen or nitrogen or both oxygen and nitrogen.

8. The method of claim 1 wherein said adsorption process is conducted at a pressure of from about −5 to about 350 psig.

9. The method of claim 1 wherein said adsorption process is conducted at a pressure of from about 2 to about 75 psig.

10. A temperature swing adsorption process for purifying a liquid feed stream comprising at least one impurity, said process comprising:
   a) supplying said liquid feed to the inlet of an adsorbent vessel containing an adsorbent bed, wherein said adsorbent vessel contains an inlet and an outlet and is configured for indirect and direct cooling,
   b) adsorbing at least part of said at least one impurity on the adsorbent in said bed thereby producing a purified liquid product leaving said adsorbent bed from the outlet of said adsorbent vessel with less impurity than present in said liquid feed at the inlet of said adsorbent vessel;
   c) removing residual liquid from said adsorbent bed, optionally by introducing a displacement purge gas;
   d) warming said adsorbent bed containing said adsorbent to a temperature, effective to desorb at least part of the adsorbed impurity and removing said adsorbed impurity from the adsorbent bed such that the liquid feed may be supplied for purposes of repeating the cycle;
   e) loading at least one inert heat transfer gas into the adsorbent vessel in an amount effective to substantially fill the void space of the adsorbent bed and at a pressure effective to maintain the adsorbent bed at positive pressure during the indirect cooling thereof;
   f) optionally indirectly cooling said adsorbent bed to a temperature sufficient to maintain the liquid feed in a liquid phase;
   g) directly cooling said adsorbent bed to a temperature such that said adsorbent bed sustains the liquid feed in a liquid phase;
   h) wherein said process steps (a)-(g) are repeated in a cyclical manner.

11. The process of claim 10 wherein said adsorbent vessel comprises an outer jacket for cooling media and an inner vessel containing said adsorbent bed, wherein a cooling media is maintained in said outer jacket in order to indirectly cool down the adsorbent in said inner vessel.

12. The process of claim 11 wherein the inert heat transfer gas is specified to the particular purification or separation process and comprises at least one of helium, hydrogen, neon, krypton, xenon, or combinations thereof.

13. The process of claim 11 wherein helium is the heat transfer gas and liquid nitrogen is the cooling media.

14. The process of claim 10 wherein said liquid feed stream is selected from oxygen, nitrogen, carbon monoxide, methane, argon, helium, neon, krypton, and xenon.

15. The process of claim 14 wherein said feed stream is argon and said impurity is oxygen, nitrogen, or both oxygen and nitrogen.

16. An adsorption process for purifying a feed stream that comprises liquid argon and oxygen, said process comprising:
   a) supplying a liquid argon feed that contains oxygen to the inlet of an adsorbent vessel containing an adsorbent bed, wherein said adsorbent vessel contains an inlet and an outlet and is configured for indirect and direct cooling, adsorbing at least part of the oxygen on the adsorbent in said bed thereby producing a purified liquid argon product leaving said adsorbent bed from the outlet of said adsorbent vessel with less oxygen than present in said liquid argon feed at the inlet of said adsorbent vessel;
   b) draining residual liquid argon from said adsorbent bed, optionally by introducing a displacement purge gas;
   c) allowing said adsorbent bed containing said adsorbent to warm to a temperature sufficient to desorb at least part of the adsorbed oxygen and removing said adsorbed oxygen from the adsorbent bed such that the liquid argon feed may be supplied for purposes of repeating the cycle;
   d) loading helium into the adsorbent vessel in an amount effective to substantially fill the void space of the adsorbent bed and at a pressure effective to maintain the adsorbent bed at positive pressure during indirect cooling;
   e) indirectly cooling said adsorbent bed to a temperature of less than about 150 degrees Kelvin using liquid nitrogen;
   f) directly cooling said adsorbent bed with purified liquid argon and/or cold helium to a temperature sufficient to sustain the argon feed in a liquid phase;
   g) wherein said process steps (a)-(f) are repeated in a cyclical manner.

17. The process of claim 16, wherein the liquid argon feed for step (a) contains more than 10 parts per million of oxygen and less or equal to 50,000 parts per million of oxygen and wherein removal of said oxygen from said liquid argon feed results in a purified liquid argon product with less than or equal to 10 parts per million of oxygen.

18. The process of claim 16, wherein in step (b) the displacement purge gas comprises nitrogen, or argon, or helium or a combination or mixture thereof.

19. The process of claim 16, further comprising a second adsorbent bed wherein in one mode of operation said second adsorbent bed is operated such that it is purifying liquid argon feed in step (a) while the first adsorbent bed is being regenerated and correspondingly the second adsorbed bed is regenerated while said first adsorbent bed is purifying the liquid argon feed in step (a), so as to produce a purified liquid argon product stream continuously, and in another operation mode said second adsorbent bed and said first adsorbent bed are operated to purify liquid argon feed in step (a) to produce a purified liquid argon product stream.

20. The process of claim 19, further comprising two or more adsorbent beds, wherein the process for purifying liquid argon in each bed is offset from one another.

21. A temperature swing adsorption process for purifying a liquid argon feed stream comprising at least one impurity, said process comprising:
　a) supplying said liquid argon feed stream to the inlet of an adsorbent vessel comprising an adsorbent bed, wherein said vessel contains an inlet and outlet and is configured for direct cooling,
　b) adsorbing at least part of said impurity on the adsorbent thereby producing a purified liquid argon product leaving said adsorbent bed from the outlet of said adsorbent vessel;
　b) draining from the outlet or inlet of said adsorbent bed residual liquid argon, optionally by introducing a displacement purge gas to the inlet or outlet of said adsorbent vessel while maintaining the adsorbent bed at temperature below 120 K;
　c) supplying a helium purge at the inlet or outlet of the adsorbent bed and allowing said adsorbent bed containing said adsorbent to warm to a temperature sufficient to desorb at least part of the adsorbed impurity and removing same from the outlet or inlet of said adsorbent bed, wherein said helium purge is maintained until the gaseous effluent exiting the inlet side of said adsorbent bed is predominantly helium, and;
　d) directly cooling said adsorbent bed with cold helium to a temperature sufficient to maintain argon in liquid form, wherein said cold helium is maintained at a positive pressure in said adsorbent vessel during the direct cooling of said adsorbent bed;
　e) wherein said process steps (a)-(d) are repeated in a cyclical manner.

22. The process of claim 21, wherein the impurity comprises oxygen, nitrogen or both oxygen and nitrogen.

23. The process of claim 21 wherein the liquid argon feed for step (a) contains more than 10 parts per million of oxygen and less or equal to 40,000 parts per million of oxygen and wherein removal of said oxygen from said liquid argon feed results in a purified liquid argon product with less than or equal to 10 parts per million of oxygen.

24. The process of claim 21, wherein the liquid argon feed for step (a) contains more than 10 parts per million of oxygen and less or equal to 40,000 parts per million of oxygen and wherein removal of said oxygen from said liquid argon feed results in a purified liquid argon product with less or equal to 1 part per million of oxygen.

25. The process of claim 21, wherein the residual liquid argon is drained from the adsorbent bed in step (b) using a displacement purge gas comprising nitrogen, or argon, or helium or a combination or mixture thereof.

26. The process of claim 21, wherein a warm nitrogen purge step precedes the warm helium purge of step (c), and the warming of the adsorbent bed in step is continued until the adsorbent bed reaches a temperature of at least 200 degrees Kelvin.

27. The process of claim 21, further comprising a second adsorbent bed wherein in one mode of operation said second adsorbent bed is operated such that it is purifying liquid argon feed in step (a) while the first adsorbent bed is being regenerated and correspondingly the second adsorbed bed is regenerated while said first adsorbent bed is purifying the liquid argon feed in step (a), so as to produce a purified liquid argon product stream continuously, and in another operation mode said second adsorbent bed and said first adsorbent bed are operated to purify liquid argon feed in step (a) to produce a purified liquid argon product stream.

28. The process of claim 21, further comprising two or more adsorbent beds, wherein the process for purifying liquid argon in each bed is offset from one another.

29. A temperature swing adsorption process for purifying a gas phase feed stream comprising at least one impurity, said process comprising:
　a) supplying said gas phase feed to the inlet of an adsorbent vessel containing an adsorbent bed, wherein said adsorbent vessel contains an inlet and an outlet and is configured for indirect and direct cooling, wherein said adsorbent vessel comprises an outer jacket for cooling media and an inner vessel containing said adsorbent bed, wherein a cooling media is maintained in said outer jacket in order to indirectly cool down the adsorbent in said inner vessel;
　b) adsorbing at least part of said at least one impurity on the adsorbent in said bed thereby producing a purified gas phase product leaving said adsorbent bed from the outlet of said adsorbent vessel with less impurity than present in said gas phase feed at the inlet of said adsorbent vessel;
　c) warming said adsorbent bed containing said adsorbent to a temperature, effective to desorb at least part of the adsorbed impurity and removing said adsorbed impurity from the adsorbent bed optionally by introducing a displacement purge gas to the inlet or outlet of said adsorbent vessel such that the gas phase feed may be supplied for purposes of repeating the cycle;
　d) loading at least one inert heat transfer gas into the adsorbent vessel in an amount effective to substantially fill the void space of the adsorbent bed and at a pressure effective to maintain the adsorbent bed at positive pressure during the indirect cooling thereof;
　e) indirectly and directly cooling said adsorbent bed to a temperature of less than about 150 degrees Kelvin;
　f) wherein said process steps (a)-(e) are repeated in a cyclical manner.

30. The process of claim 29 wherein the inert heat transfer gas is specified to the particular purification or separation process and comprises at least one of helium, hydrogen, neon, krypton, xenon, or combinations thereof.

31. The process of claim 30 wherein helium is the heat transfer gas and liquid nitrogen is the cooling media.

32. The process of claim 29 wherein said gas phase feed stream is selected from oxygen, nitrogen, carbon monoxide, methane, argon, helium, neon, krypton, and xenon.

33. The process of claim 29 wherein said feed stream is argon and said impurity is oxygen, nitrogen, or both oxygen and nitrogen.

34. The process of claim 33, wherein the gas phase argon feed for step (a) contains from about 10 parts per million to about 50,000 parts per million of oxygen and wherein removal of said oxygen from said argon feed results in a purified argon product with less than or equal to 10 parts per million of oxygen.

35. The process of claim 29, wherein in step (c) the displacement purge gas comprises nitrogen, or helium or a combination or mixture thereof.

36. The process of claim 29, further comprising a second adsorbent bed wherein in one mode of operation said second adsorbent bed is operated such that it is purifying argon feed in step (a) while the first adsorbent bed is being regenerated and correspondingly the second adsorbed bed is regenerated while said first adsorbent bed is purifying the argon feed in step (a), so as to produce a purified argon product stream continuously, and in another operation mode said second adsorbent bed and said first adsorbent bed are operated to purify argon feed in step (a) to produce a purified argon product stream.

37. The process of claim 36, further comprising two or more adsorbent beds, wherein the process for purifying argon in each bed is offset from one another.

38. The process of claim 29 wherein the displacement purge gas is introduced into said adsorbent vessel while maintaining the adsorbent bed at a temperature of from about 90-150 degrees Kelvin and a pressure of about 15 psig.

* * * * *